Patented Sept. 2, 1941

2,254,665

UNITED STATES PATENT OFFICE 2,254,665

INSECT REPELLENT CONTAINING ALIPHATIC ALCOHOLS

Anderson W. Ralston and John P. Barrett, Chicago, Ill., assignors to Armour and Company, Chicago, Ill., a corporation of Illinois No Drawing. Application September 5, 1939, Serial No. 293,522

5 Claims. (Cl. 167—22)

This invention relates to repellents for insects such as mosquitoes, flies, and gnats and more specifically to repellents comprising aliphatic alcohols containing from ten to fourteen carbon atoms.

Both humans and animals are annoyed by insects and this problem is so acute as to render certain regions essentially uninhabitable by man. Disregarding the annoyance, insect bites are often accompanied by profound and in some cases serious physiological effects. Many diseases, particularly those of tropical origin, are transmitted by means of insect bites. In spite of man's constant warfare against insects they still occur in large numbers and they continue to plague both man and animals. Insecticide chemists have devoted considerable time and effort to this problem. Thousands of compounds have been tested for their toxic effect upon insects. These compounds either act as stomach poisons or respiratory paralyzers and are effective in a number of instances.

Another approach to the problem, which has also been given considerable thought, is the development of substances which have a repellent effect upon the insects. These substances can be applied upon the host in a variety of manners and serves to prevent attacks by insects which under normal conditions are attracted to these individuals.

Toxicity and repellency are not usually correlated, and it does not follow that a substance toxic to the insect is in any way repellent to it. On the other hand materials that are repellent to insects are not generally toxic and in a number of cases effective repellents are actually harmless to insects.

In order to be effective for this purpose the substance must, of course, possess a high degree of repellency. In addition they must not be toxic or harmful to the individual treated. In general, it is believed that repellents are irritating to the sensory mechanism of the insect. It does not follow that a substance possessing this sensory irritating effect upon insects has a similar effect upon humans or animals. In a number of instances substances which definitely repel insects are pleasing to man and substances repugnant to man are attractive to insects.

We have experimented extensively with various materials which might have insect repellent properties, and have now discovered that aliphatic alcohols having ten to fourteen carbon atoms are extremely effective insect repellents.

Before describing ways by which our discoveries can be put to practical use we shall first show the effectiveness of our alcohols in comparison with other materials and in comparison with alcohols of less or greater carbon atom content. The testing method with flies is as follows: Three to four hundred adult domestic flies (Musca domestica) are confined in a sixteen mesh screened cage. The inside dimensions of the cage are: height, 19.5 inches; width, 9.5 inches, and length, 14.5 inches. The top and bottom, and also the two narrow sides, are of wood and the two broad sides are covered with sixteen mesh screening. The cage is equipped with a trap door for the introduction of water, food, and test samples. The flies used are of known age and are grown under laboratory conditions. Six hours prior to each test the food is removed from the cage. Water is present at all times. The tests are conducted at a constant temperature of 85° F. and 65% relative humidity. Two grams of malt extract (Dimalt extract—Fleischmann) are placed in the middle of a seven centimeter filter paper and spread into a circle approximately two inches in diameter. These are then placed for a period of from ten to twelve hours in a constant temperature oven (37° C.). The purpose of this baking is to dry the extract so that it will not flow from the test piece. One drop of the compound to be tested is then placed in the middle of the malt extract disk, and spread uniformly over the surface of the malt. These are introduced into the cage after a period of fifteen minutes. The disks are pinned to the inside screened surface of the cage. They are placed in the cage in such a manner that the untreated surface of the disk faces the light. Generally four or five disks are placed in each cage and in every case one of the disks contains only the malt extract. This serves as a check and all results are referred to it.

The principle of this procedure is to protect a known attractant. The malt is attractive to the flies for whom it is served as food. The natural tendency of the flies, therefore, is to be attracted to and eat the malt. The repellent properties of the test compound are measured by its ability to overcome this natural tendency. The order of repellency of compounds is easily tested by this method since the flies will eat all of the malt upon the most attractive disk and after exhaustion of this malt will go to the test sample least repellent. In the case of highly repellent compounds no flies will eat the treated malt or light upon the disk containing it.

Fifteen minutes after the introduction of the test sample the number of flies feeding upon each disk is recorded. Counts are made at half-hour intervals thereafter for a period of at least three hours.

As stated, we have discovered that aliphatic primary alcohols containing ten to fourteen inclusive carbon atoms are excellent insect repellents and that these alcohols can be used either by themselves or admixed with other substances. The following tables compare these alcohols with other substances.

TABLE 1

Repellent action of lauric acid and dodecyl alcohol (number of flies)

| Time in minutes | Compound | | |
|---|---|---|---|
| | Check (Dimalt) | Dodecyl alcohol | Lauric acid |
| 15 | 19 | 0 | 14 |
| 45 | 19 | 1 | 2 |
| 75 | 20 | 0 | 5 |
| 105 | 18 | 0 | 9 |
| 135 | 17 | 0 | 4 |
| 165 | 13 | 0 | 1 |
| Total | 106 | 1 | 35 |

The results shown in Table 1 show lauric acid to be only mildly repellent and dodecyl alcohol to be highly repellent.

Table 2 shows the repellent action of various fatty acid derivatives compared with oil of citronella. Oil of citronella was chosen for this comparison because of its known repellent action.

TABLE 2

Repellent action of lauric acid, stearonitrile, oil of citronella and dodecyl alcohol (number of flies)

| Time in minutes | Blank (Dimalt) | Lauric acid | Stearo-nitrile | Oil of citronella | Dodecyl alcohol |
|---|---|---|---|---|---|
| 15 | 61 | 53 | 38 | 0 | 1 |
| 45 | 67 | 59 | 44 | 0 | 0 |
| 75 | 40 | 24 | 37 | 3 | 0 |
| 105 | 36 | 10 | 19 | 3 | 1 |
| 135 | 31 | 6 | 22 | 4 | 0 |
| 165 | 25 | 5 | 8 | 5 | 0 |
| 195 | 15 | 4 | 12 | 4 | 0 |
| 225 | 13 | 4 | 5 | 4 | 2 |
| Total | 228 | 165 | 185 | 19 | 2 |

These results show that lauric acid and stearonitrile are inferior to oil of citronella as an insect repellent and that dodecyl alcohol is superior to oil of citronella.

Table 3 shows the repellent action of several alcohols.

TABLE 3

Repellent action of octyl alcohol, dodecyl alcohol, and hexadecyl alcohol (number of flies)

| Time in minutes | Alcohol | | | |
|---|---|---|---|---|
| | Check (Dimalt) | Octyl | Dodecyl | Hexadecyl |
| 15 | 63 | 27 | 9 | 48 |
| 45 | 39 | 20 | 0 | 54 |
| 75 | 17 | 12 | 0 | 31 |
| 105 | 15 | 8 | 0 | 18 |
| 135 | 17 | 6 | 0 | 14 |
| Total | 151 | 73 | 9 | 165 |

The data presented in this table shows that hexadecyl alcohol is essentially without repellent action, octyl alcohol containing eight carbon atoms, is only mildly repellent, and dodecyl alcohol is strongly repellent.

Table 4 shows the repellent action of decyl, undecyl, and undecenyl alcohols.

TABLE 4

Repellent action of decyl, undecyl, and undecenyl alcohols (number of flies)

| Time in minutes | Alcohol | | | |
|---|---|---|---|---|
| | Check (Dimalt) | Decyl | Undecyl | Undecenyl |
| 15 | 61 | 3 | 1 | 0 |
| 45 | 54 | 1 | 0 | 2 |
| 75 | 18 | 2 | 0 | 0 |
| 105 | 19 | 0 | 0 | 0 |
| 135 | 14 | 0 | 1 | 0 |
| 165 | 22 | 1 | 0 | 1 |
| Total | 188 | 7 | 2 | 3 |

The results tabulated in Table 4 show decyl, undecyl, and undecenyl alcohols to be quite highly repellent. These alcohols containing ten and eleven carbon atoms, the undecenyl alcohol being unsaturated.

Table 5 shows the repellent action of tridecyl alcohol and tetradecyl alcohol.

TABLE 5

Repellent action of tridecyl and tetradecyl alcohols (number of flies)

| Time in minutes | Alcohol | | |
|---|---|---|---|
| | Check (Dimalt) | Tridecyl | Tetradecyl |
| 15 | 52 | 1 | 0 |
| 45 | 41 | 2 | 3 |
| 75 | 23 | 0 | 0 |
| 105 | 17 | 0 | 1 |
| 135 | 14 | 0 | 0 |
| 165 | 17 | 1 | 0 |
| Total | 164 | 4 | 4 |

The results recorded in Table 5 show tridecyl and tetradecyl alcohols to be quite highly repellent. But when the number of carbon atoms increases to sixteen (hexadecyl, Table 3) repellent action decreases rapidly.

Table 6 shows that the alcohols we use can be perfumed without decreasing the repellent power.

TABLE 6

Repellent action of perfumed and unperfumed dodecyl alcohol (number of flies)

| Time in minutes | Sample | | |
|---|---|---|---|
| | Check (Dimalt) | Dodecyl alcohol | Perfumed dodecyl alcohol |
| 15 | 48 | 1 | 0 |
| 45 | 46 | 0 | 1 |
| 75 | 21 | 0 | 2 |
| 105 | 17 | 1 | 0 |
| 135 | 18 | 0 | 0 |
| 165 | 14 | 0 | 0 |
| Total | 164 | 2 | 3 |

The results tabulated in Table 6 show that the perfumed dodecyl alcohol is the equivalent of the unperfumed dodecyl alcohol in repellent action.

The above results show that aliphatic alcohols containing from ten to fourteen carbon atoms inclusive possess superior repellent action. As previously stated, this repellent action does not necessarily correlate any toxic action which these compounds may or may not have for the insects in question.

Like repellent activity is obtained against mosquitoes. The testing method is as follows: The mosquitoes are inclosed in a screened cage equipped with rubber sleeves. The operator spreads several drops of the material to be tested over his forearm and inserts his arm into the cage through the sleeves. If the compound possesses high repellent action the mosquitoes do not attack the operator's arm. However, if the compound is mildly repellent or possesses no repellent activity they immediately attack the operator. These tests were performed using oil of citronella, stearonitrile, lauric acid, and the various alcohols described herein. The results show conclusively that alcohols from ten to fourteen carbon atoms inclusive possess a high degree of repellency for mosquitoes.

The aliphatic straight chain saturated and unsaturated alcohols having ten to fourteen carbon atoms also act as a repellent for ants and moths. For example, dusting powders consisting of an inert material, such as pumice, admixed with small amounts of the alcohols effectively prevents the ingress of ants. Woolen materials containing traces of our alcohols are no longer attractive to moths.

Feeding tests of our alcohols using rabbits, rats, and guinea pigs showed the alcohols to be without toxic action. Dodecyl alcohol was injected subcutaneously without serious effect. Dodecyl alcohol rubbed upon the skin of humans, dogs, and rats was without effect.

Our discovery of the marked repellent action of the alcohols of our invention can be put to practical use in many different ways. Since the alcohols are without effect on the human skin, they can be lightly rubbed on the skin in much the same way as oil of citronella and thus effectively repel the more common insects, such as flies and mosquitoes. Or the alcohols can be dissolved or emulsified in any suitable vehicle to give liquid products readily applied to the human skin. Paper can be impregnated with such solutions to give a paper product which, in sheet form, can be laid over exposed articles of food in the kitchen and in the shop to prevent flies from lighting thereon. Animal sprays likewise consisting of aqueous emulsions of the alcohols or solutions thereof in any suitable solvent, can be prepared and cattle sprayed therewith.

Since the gist of our invention is in the discovery of the unusual insect repellent properties of these aliphatic alcohols we claim our invention broadly in the appended claims. It will be readily apparent to those skilled in the art that our invention can be put to use in many different ways in accordance with prior applications of insect repellent materials.

Having thus described our invention, what we claim is:

1. An insect repellent having as its essential active ingredient a primary aliphatic alcohol having from ten to fourteen carbon atoms.

2. An insect repellent having as its essential active ingredient a primary aliphatic alcohol having ten to fourteen carbon atoms, together with a perfuming agent.

3. An insect repellent having as its essential active ingredient a primary unsaturated aliphatic alcohol having ten to fourteen carbon atoms.

4. An insect repellent containing decyl alcohol as its essential active ingredient.

5. An insect repellent containing dodecyl alcohol as its essential active ingredient.

ANDERSON W. RALSTON.
JOHN P. BARRETT.